United States Patent
Black et al.

(10) Patent No.: US 8,494,593 B2
(45) Date of Patent: Jul. 23, 2013

(54) METHOD AND SYSTEM FOR WIRELESS COVERAGE REDUNDANCY

(75) Inventors: Peter J. Black, San Diego, CA (US); Matthew S. Grob, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 12/359,068

(22) Filed: Jan. 23, 2009

(65) Prior Publication Data

US 2010/0190533 A1 Jul. 29, 2010

(51) Int. Cl.
*H04W 52/00* (2009.01)
(52) U.S. Cl.
USPC ............... 455/571; 455/422.1; 455/456.5; 455/444; 455/445; 455/561
(58) Field of Classification Search
None
See application file for complete search history.

(56) References Cited

U.S. PATENT DOCUMENTS

| 7,352,693 | B2 | 4/2008 | Seid et al. | |
| 2004/0196793 | A1* | 10/2004 | Lucidarme et al. | 370/252 |
| 2007/0155375 | A1* | 7/2007 | Kappel et al. | 455/422.1 |
| 2008/0002631 | A1* | 1/2008 | Ramachandran | 370/338 |
| 2010/0056184 | A1* | 3/2010 | Vakil et al. | 455/456.5 |

FOREIGN PATENT DOCUMENTS

WO WO2008040021 4/2008

OTHER PUBLICATIONS

International Search Report & Written Opinion—PCT/US2009/037991, International Search Authority—European Patent Office—Nov. 5, 2009.
Taiwan Search Report—TW098109568—TIPO—Jul. 25, 2012.

* cited by examiner

*Primary Examiner* — Yuwen Pan
*Assistant Examiner* — Fanghwa Wang
(74) *Attorney, Agent, or Firm* — Florin C. Corie

(57) ABSTRACT

Devices and methods are provided for providing wireless coverage redundancy in case, for example, the backhaul of an access point (AP) base station is not available. In one embodiment, the method involves monitoring the backhaul, and in response to the backhaul being available, facilitating communication between an access terminal (AT) and the macro network via the backhaul. In addition, or in the alternative (e.g., when the backhaul is not available), a communication signal between the AT and a macro base station (or another AP base station) may be boosted.

46 Claims, 16 Drawing Sheets

METHOD AND SYSTEM FOR WIRELESS COVERAGE REDUNDANCY

BACKGROUND

1. Field

The present application relates generally to wireless communications, and more specifically to methods and systems for facilitating communication between a wireless device and a macro network using a dual mode base station.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices. In addition to mobile phone networks currently in place, a new class of small base stations has emerged, which may be installed in a user's home and provide indoor wireless coverage to mobile units using existing broadband internet connections. Such personal miniature base stations are generally known as an access point (AP) base station, also referred to as Home Node B (HNB) unit, femto cell, femto base station (fBS), base station, or base station transceiver system (BTS). Typically, such miniature base stations are connected to the internet and the mobile operator's network via a digital subscriber line (DSL) router or cable modem.

AP base stations or femto cells allow for cellular access where base station support is weak or unavailable (e.g., indoors, remote locations, and the like). AP base stations may be described as small base stations that connect to wireless service providers via a broadband backhaul link, such as DSL, cable internet access, T1/T3, etc., and offer typical base station functionality, such as base transceiver station (BTS) technology, radio network controller, and gateway support node services. This allows an access terminal (AT), also referred to as a cellular/mobile device or handset, or user equipment (UE), to connect to the AP base stations and utilize the wireless service. It is noted that ATs can include, for example, cellular phones, smart phones, laptops, handheld communication devices, handheld computing devices, satellite radios, navigational devices, personal digital assistants (PDAs), and/or any other suitable device for communicating over a wireless communication system.

Sometimes the backhaul associated with a given AP base station may not be available for a whole host of reasons, including but not limited to when there is outage or failure of the backhaul or when the backhaul is intentionally disconnected. It is noted that the backhaul may not be available during normal backhaul operations, such as when the backhaul service provider is running or performing a maintenance procedure, a line adjustment, an upgrade, a test, or the like, or combinations thereof. The running of such tests, upgrades, etc. may be common or routine for residential backhauls or the like. In situations where such backhaul outages occur (planned or unplanned) and/or the signal strength for communications from/to a macro base station is weak, it would be desirable to provide an alternative way to facilitate communication between a given AT and the macro network. Accordingly, there is a need for a method and system for implementing an AP base station that provides wireless redundancy in case the backhaul is not available, or in case one or more ATs do not have access to the AP base station despite being the coverage area of the AP base station.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method for wireless coverage redundancy. For example, the method may involve monitoring a communication backhaul in operative communication with a macro network. In response to the backhaul being available, the method may involve facilitating communication between an access terminal (AT) and the macro network via the backhaul. Additionally, or alternatively, such as in response to the backhaul not being available (e.g., when the backhaul is intentionally disconnected, when there is unintentional failure, such as when the backhaul fails to operate normally, or when there is no failure but the backhaul service provider is performing a maintenance procedure, an upgrade, a test, etc.), the method may involve boosting a communication signal between the AT and a base station in operative communication with the macro network.

In related aspects, when the backhaul is available, the step of facilitating communication may involve allowing the AT to access an access point (AP) base station in operative communication with the backhaul. Facilitating may further involve allowing the macro network to locate and communicate with the AT via the AP base station.

In further related aspects, when the backhaul is not available, the step of boosting the communication signal may involve boosting the signal between the AT and a macro base station in operative communication with the macro network. In the alternative, or in addition, boosting may involve boosting the signal between the AT and a separate AP base station associated with another communication backhaul in operative communication with the macro network.

In accordance with one or more embodiments and corresponding disclosure thereof, various aspects are described in connection with devices and apparatuses for wireless coverage redundancy. The example, a wireless communication device may include: a backhaul interface for a communication backhaul in operative communication with a macro network; and a transceiver module for communicating with at least one of (i) an access terminal (AT), (ii) the macro network via the backhaul, and (iii) a base station in operative communication with the macro network. The device may include: at least one processor operatively coupled with the interface and the transceiver module; and a memory module operatively coupled with the at least one processor.

The memory may include comprising executable code for the at least one processor to: (a) monitor the backhaul; (b) in response to the backhaul being available, facilitate communication between the AT and the macro network via the backhaul; and (c) in response to the backhaul not being available, boosting a communication signal between the AT and the base station. In one embodiment, the base station comprises a macro base station in operative communication with the macro network. In another embodiment, the base station comprises a separate AP base station associated with another communication backhaul in operative communication with the macro network.

In related aspects, the at least one processor may facilitate communication between the AT and the macro network by allowing the AT to access an access point (AP) of the device in operative communication with the backhaul. The at least one processor may allow the macro network to locate and communicate with the AT via the AP base station.

In further related aspects, the transceiver module may include a transceiver for communicating with (i) the macro network via the backhaul and (ii) the base station. In the alternative, the transceiver module may include a first transceiver for communicating with the macro network via the backhaul, as well as a second transceiver for communicating with the base station.

In still further related aspects, the at least one processor may regulate at least one of (i) a first transmission power of the first transceiver and (ii) a second transmission power of the second transceiver to reduce interference between first and second transmissions. In one approach, the at least one processor may match the first and second transmission powers to be approximately equal.

DETAILED DESCRIPTION

Figure 1:
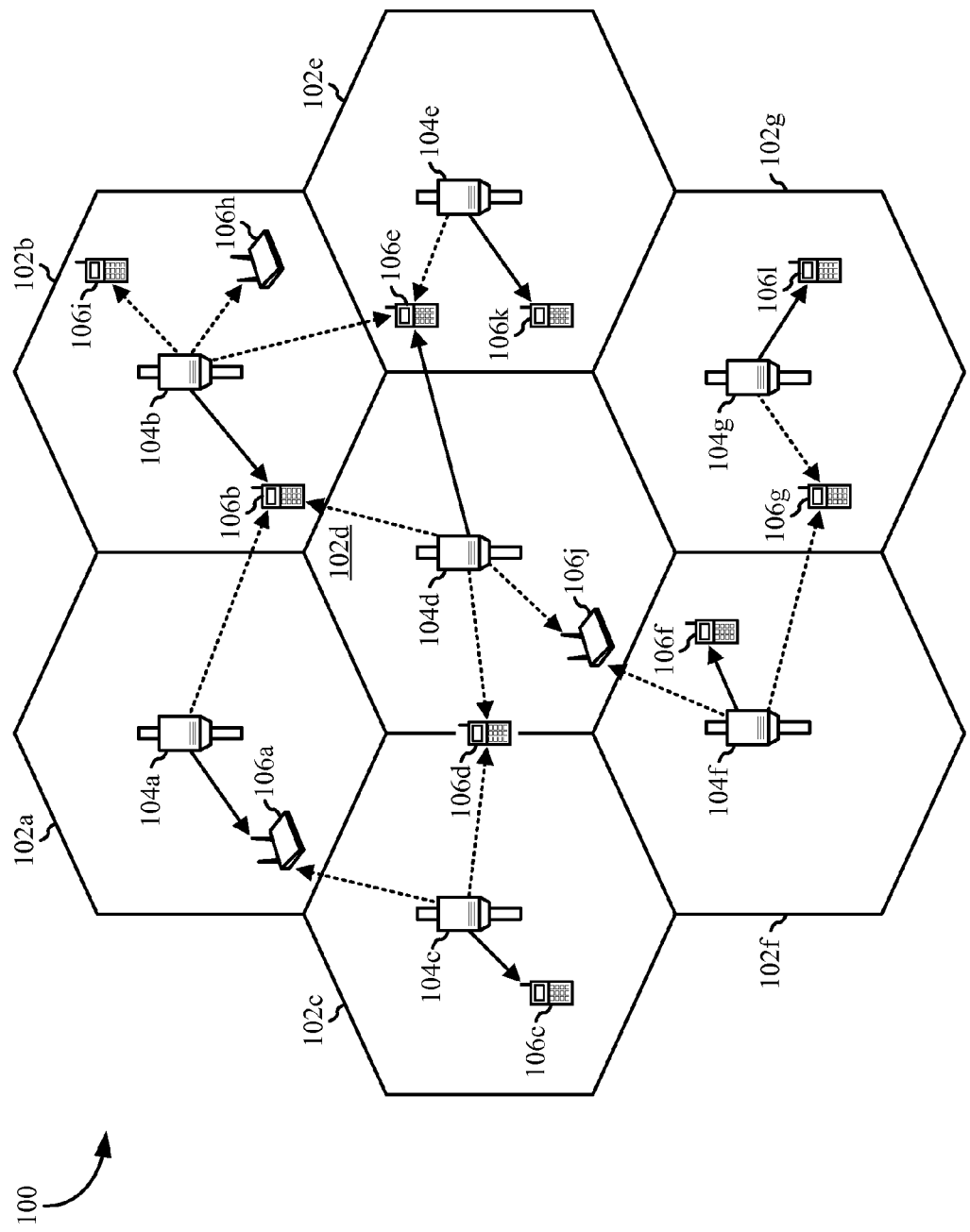
FIG. 1 illustrates an exemplary wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Access point (AP) base stations can be deployed to individual consumers and placed in homes, apartment buildings, office buildings, and the like. An AP base station can communicate wirelessly with an AT in range of the AP base station utilizing a licensed cellular transmission band. Further, AP base stations may be connected to a core cellular network by way of an Internet Protocol (IP) connection, such as a Digital Subscriber Line (DSL, e.g., including Asymmetric DSL (ADSL), High data rate DSL (HDSL), Very high speed DSL (VDSL), etc.), a TV cable carrying IP traffic, a Broadband over Power Line (BPL) connection, or like connection. The connection between the IP line and the cellular network can be a direct connection, or by way of the internet. An AP base station, therefore, can provide cellular support to an AT or cellular handset and route cellular traffic (e.g., voice, data, video, audio, internet, etc.) to a macro cellular network through the IP connection. This mechanism can save consumers air time costs and reduce a network provider's cellular network traffic load. Also, cellular coverage inside a home, office building, apartment, etc. can be greatly improved via implementation of AP base stations. It is noted that the AP base station can communicate with the core cellular network by way of a non-IP connection that implements Asynchronous Transfer Mode (ATM) or the like.

Although an AP base station is capable of forming a cellular link (e.g., a wireless link utilizing one or more licensed radio network frequencies) with multiple ATs, a consumer typically desires only his or her own traffic to be carried by a private IP connection connected to the AP base station. For instance, consumers may wish to preserve IP bandwidth for their own use, rather than for the use of other AT users. As a result, an AP base station is generally associated only with a single AT or group of ATs, and traffic related to such AT(s) is routed over the consumer's IP connection, whereas traffic related to other ATs is blocked. Consequently, although the AP base station can communicate with multiple ATs regardless of subscriber, the AP base station is typically programmed to ignore devices that are not associated with a particular consumer, service plan, or the like.

FIG. 1 illustrates an exemplary wireless communication system 100 configured to support a number of users, in which various disclosed embodiments and aspects may be implemented. As shown in FIG. 1, by way of example, system 100 provides communication for multiple cells 102, such as, for example, macro cells 102a-102g, with each cell being serviced by a corresponding access point (AP) 104 (such as APs 104a-104g). Each cell may be further divided into one or more sectors. Various access terminals (ATs) 106, including ATs 106a-106k, also known interchangeably as user equipment (UE), are dispersed throughout the system. Each AT 106 may communicate with one or more APs 104 on a forward link (FL) and/or a reverse link (RL) at a given moment, depending upon whether the AT is active and whether it is in soft handoff, for example. Wireless communication system 100 may provide service over a large geographic region, for example, macro cells 102a-102g may cover a few blocks in a neighborhood.

Figure 2:
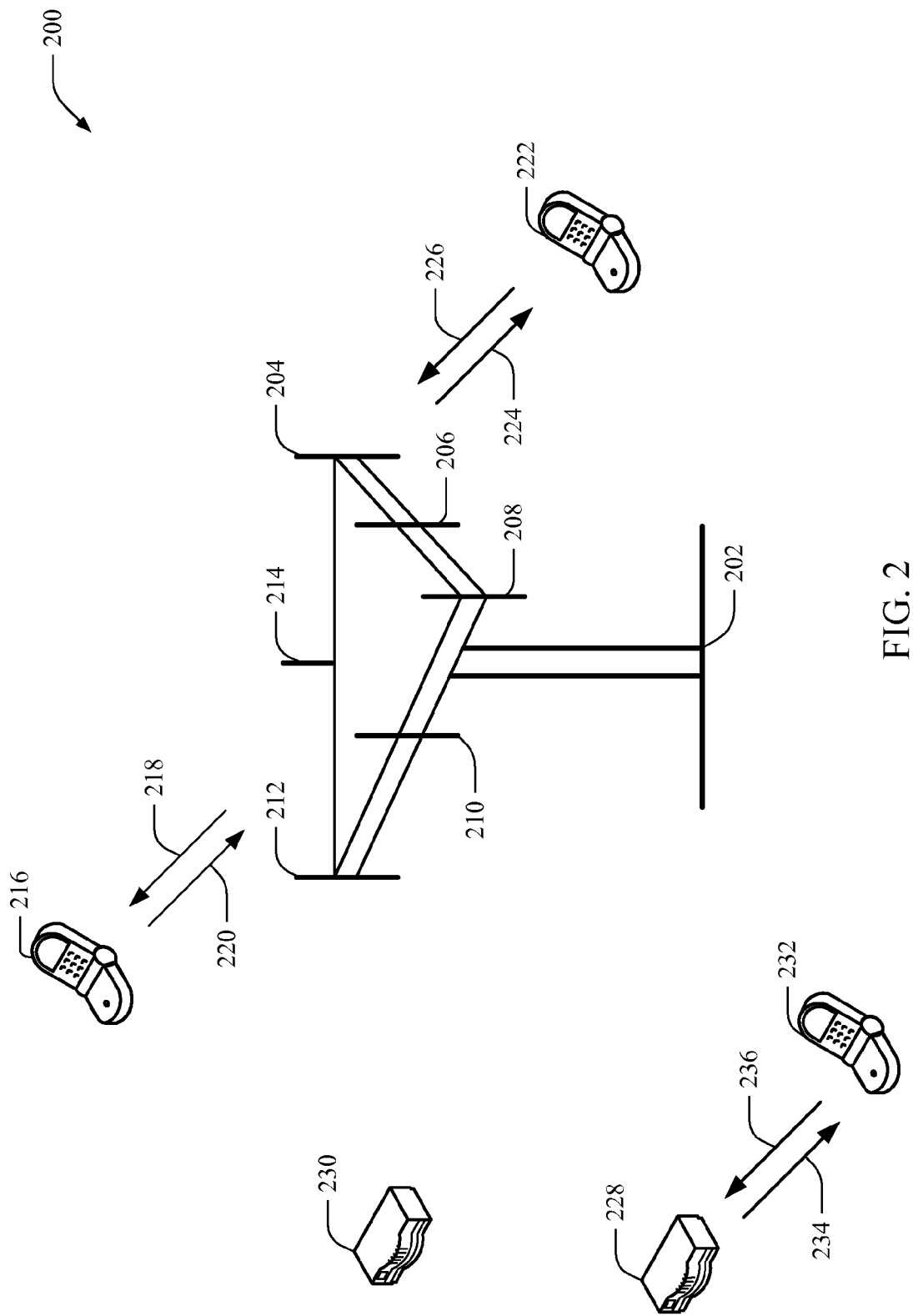
FIG. 2 is an illustration of a wireless communication system in accordance with one or more aspects set forth herein.

Referring now to FIG. 2, a wireless communication system 200 is illustrated in accordance with various embodiments presented herein. System 200 comprises a macro base station 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. Base station 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 202 can communicate with one or more ATs, such as, for example, AT 216 and AT 222.

As depicted in FIG. 2, AT 216 is in communication with antennas 212 and 214, where antennas 212 and 214 transmit information to AT 216 over a forward link 218 and receive information from AT 216 over a reverse link 220. Moreover, AT 222 is in communication with antennas 204 and 206, where antennas 204 and 206 transmit information to AT 222 over a forward link 224 and receive information from AT 222 over a reverse link 226. In a Frequency Division Duplex (FDD) system, forward link 218 can utilize a different frequency band than that used by reverse link 220, and forward link 224 can employ a different frequency band than that employed by reverse link 226, for example. Further, in a Time Division Duplex (TDD) system, forward link 218 and reverse link 220 can utilize a common frequency band and forward link 224 and reverse link 226 can utilize a common frequency band.

Each group of antennas and/or the area in which they are designated to communicate can be referred to as a sector of macro base station 202. For example, antenna groups can be designed to communicate to ATs in a sector of the areas covered by base station 202. In communication over forward links 218 and 224, the transmitting antennas of base station 202 can utilize beamforming to improve the signal-to-noise ratio of forward links 218 and 224 for ATs 216 and 222. Also, while base station 202 utilizes beamforming to transmit to ATs 216 and 222 scattered randomly through an associated coverage, ATs in neighboring cells can be subject to less interference as compared to a base station transmitting through a single antenna to all its ATs. Moreover, ATs 216 and 222 can communicate directly with one another using a peer-to-peer or ad hoc technology in one example.

Similar functionality of macro base station 202 can be implemented in AP base stations 228 and 230, which can be deployed in smaller scale locations, such as a residence or office building for example. As mentioned previously, AP base stations are also referred to as femto cells or Home Node B (HNB) units, and can have a broadband backhaul link to a wireless service provider, such as over DSL, cable, T1/T3, etc., and can provide wireless communication service to one or more ATs. As shown, AP base station 228 can communicate with one or more AT(s) 232 over a forward link 234 and receive communication from the AT(s) 232 over a reverse link 236 similarly to the base station 202.

According to an example, AP base station 230 can be deployed to provide wireless service access. AP base station 230 can connect to a wireless service access provider via broadband backhaul link, one or more disparate femto cells or macro cells over-the-air, etc. Upon being deployed, AP base station 230 can optionally self-configure to avoid interference with surrounding femto cells (e.g., AP base station 228) and macro cells (e.g., base station 202 or a sector/cell thereof). In this regard, AP base station 230 can receive signals from the base station 202 and disparate AP base station 228 much like ATs 216, 222, and 232. The signals can be overhead system messages that can be utilized by the AP base station 230 to determine configuration parameters utilized by the disparate AP base station 228 and/or base station 202.

The configuration parameters can be determined by AP base station 230 for similar environment configuration. In addition, the parameters can be determined and utilized to ensure AP base station 230 selects different parameters to mitigate interference. These parameters can include, for example, a channel identifier (e.g., a Code Division Multiple Access (CDMA) channel ID), a pseudo-noise (PN) offset, and/or the like, for AP base station 228, macro base station 202, and/or substantially any other surrounding transmitters. AP base station 230 can accordingly self-configure its channel identifier, PN offset, etc. so as not to interfere with the surrounding femto cells and macro cells. Additionally, AP base station 230 can utilize this information to build a neighbor list of surrounding femto cells and macro cells to facilitate hard and soft handoffs for devices communicating with AP base station 230. It is noted that AP base station 230 may be adapted to receive RF signals, for example, from AP base station 228 and/or base station 202 to determine timing, location, and/or the like.

Figure 3:
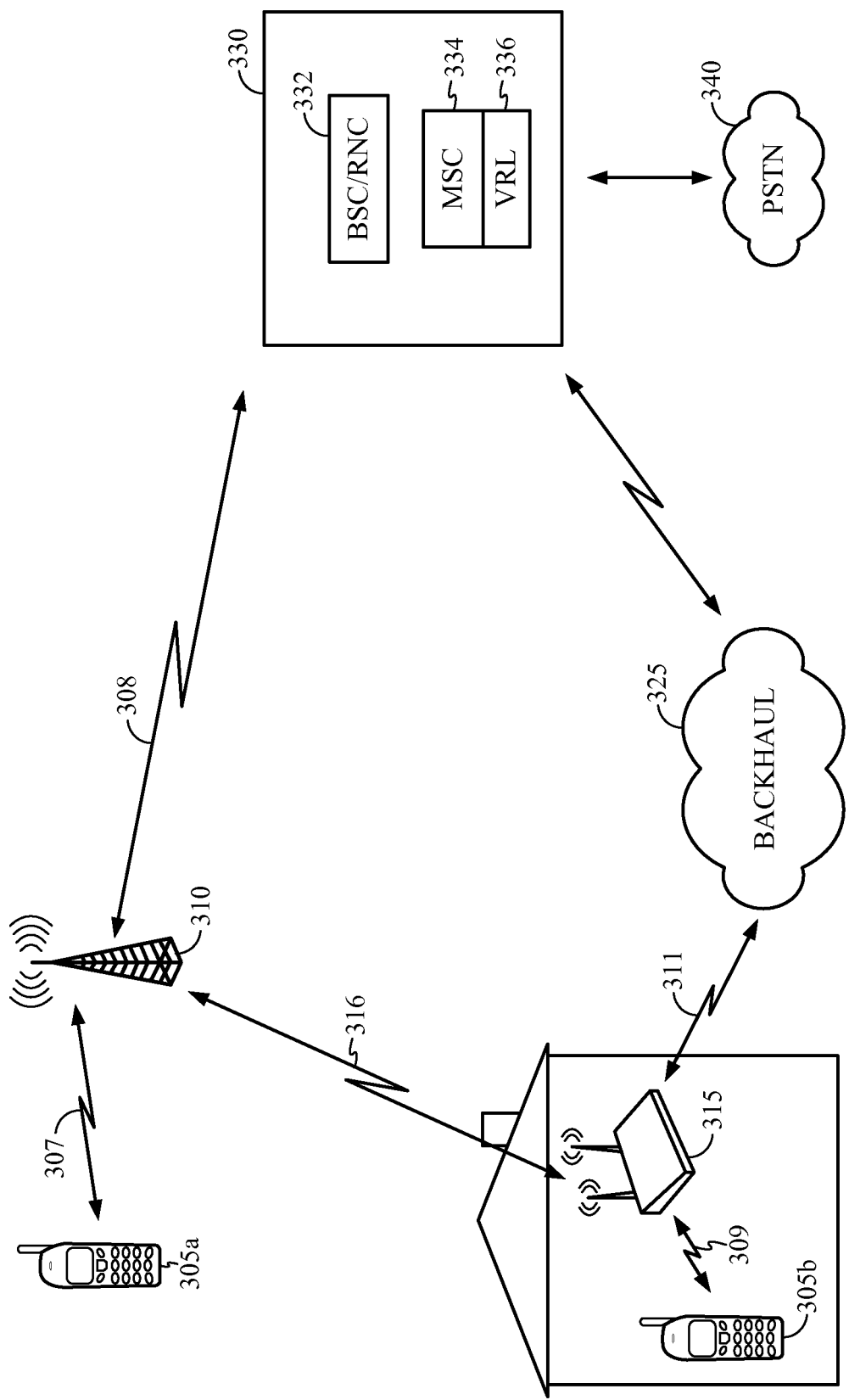
FIG. 3 illustrates an exemplary environment within which a dual mode base station may be implemented.

As previously mentioned, there is a need for an AP base station provides wireless redundancy in case the backhaul is not available, or in case one or more ATs do not have access to the AP base station. The techniques described herein address the need for ATs to communicate with a macro network of a wireless service provider even when the backhaul is not available and/or the signal strength for communications from/to a macro base station is weak. In accordance with aspects of the wireless coverage redundancy methods and systems described herein, FIG. 3 illustrates an exemplary system 300 within which a dual mode base station 315 may be implemented. Dual mode base station 315 may operate in femto mode, repeater mode, and/or femto-repeater mode, as explained in further detail below.

System 300 may include an AT 305a in operative communication with a macro base station 310 operatively coupled to a macro network 330, which comprises or is otherwise operatively coupled to a macro network core. System 300 may also include an AT 305b in operative communication with dual mode base station 315, operatively coupled to a communication backhaul 325, which is in turn operatively coupled to the network core of macro network 330.

In operation, mobile device 305a may send and receive data from macro base station 310 via a communication link 307, which may use various communication standards such as CDMAone, CDMA2000, Wideband CDMA (W-CDMA, also known as Universal Mobile Telecommunications System (UMTS)), Ultra Mobile Broadband (UMB), Long Term Evolution (LTE), LTE-Advanced (LTE-A), Worldwide Interoperability for Microwave Access (WiMAx), etc. Base station 310 may be in communication with macro network 330 via link 308. It is noted that system 300 may be configured to operate on 3rd Generation Partnership Project (3GPP) (Re199, Re15, Re16, Re17) technology, as well as 3GPP2 (1xRTT, 1xEV-DO Re10, RevA, RevB) technology, and other known and related technologies.

Macro network 330 may include a network controller at its network core. Depending on the types of the communication network deployed, the network controller may be a Radio Network Controller (RNC), a modified RNC, an Unlicensed Mobile Access (UMA) network controller (UNA), or a Session Initiation Protocol (SIP) gateway, or the like. In the illustrated example, macro base station 310 is in operative communication with RNC 332 of macro network 330. In the embodiment of FIG. 3, macro network 330 includes a Base Station Controller (BSC) or RNC 332. BSC/RNC 332 may be in operative communication with a Message Switching Center (MSC) 334 or similar service delivery node responsible for handling voice calls, Short Message Service (SMS), as well as other services (e.g., conference calls, FAX and circuit switched data). MSC 334 may set up and release the end-to-end connections, handle mobility and hand-over requirements during the call, take care of charging and real time pre-paid account monitoring, etc.

MSC 334 may include or be coupled to a Visitor Location Register (VLR) 336 or similar temporary database of network subscribers who have entered or roamed into a particular area.

VLR 336 may be in operative communication with a registry (not shown), which may generally comprise a database that contains details of mobile phone subscribers authorized to use the operator's network. MSC 334 may be in operative communication with a Public Switched Telephone Network (PSTN) 340, Public Line Mobile Network (PLMN), or other similar network. In this way, macro network 330 can deliver voice and data services to end users that are connected to one of those networks. System 300 may be scaled to include additional MSCs and registries (not shown) in operative communication with MSC 334 to increase capacity.

In related aspects, mobile device 305b may communicate with macro network 330 via dual mode base station 315 configured to use backhaul service 325 to transfer voice and/or non-voice data therebetween. Backhaul service 325 may include the internet, a DSL service, a cable internet service, a Local Area Network (LAN), a Wide Area Network (WAN), a Plain Old Telephone System (POTS), or any other suitable broadband network or the like. Mobile 305b may communicate with base station 315 via communication link 309, and may incorporate one or more features of AP base stations described above with reference to FIG. 2. It is noted that base station 315 includes as one of its features the ability to provide a femto cell through which a given AT may communicate with the network core of the macro network 330.

Dual mode base station 315 may be configured to transfer data over backhaul network 325 via communication link 311. Depending on the type of system being deployed, communication link 311 may use Voice over IP (VoIP), UMA signaling, SIP signaling, or other suitable communication network protocol, such as, for example, Iub over IP. Iub is a standard transport protocol that may be designed to encapsulate voice and/or non-voice data and to signal as an IP that is tunneled over network 325.

Macro network 330 may process data received from network 325 with a suitable network controller, analogous to the manner in which macro network 330 handles data from macro base station 310. The type of network controller used by macro network 330 depends at least in part on the architecture or types of components of dual mode base station 315. For example, there are various femto cell architectures such as, for example, IP Radio Access Network (RAN) and SIP/IMS. Within the IP RAN architecture there may be provided various femto cell solutions, such as, for example, modified RNCs, concentrators, etc. implementing various hardware architectures in the network core and/or in the dual mode base station.

It is also noted that system 300 may comprise WAN macro cells and femto cells deployed within the same general geographical area that reuse the same carrier as the WAN system. In one approach, the WAN system may use a legacy technology, while the femto cell system may use a new technology, such as, for example, an evolved version of the legacy technology that supports AP base station operation efficiently.

In further related aspects, dual mode base station 315 may be configured to transfer data between a given mobile device 305 and macro network 330 using either the built-in femto cell functionalities or the repeater functionalities. When dual mode base station 315 operates in femto mode, base station 315 may communicate with the network core of macro network 330 via network 325, as described above. When dual base station 315 operates in repeater mode, base station 315 may act as a repeater for macro base station 310 and boost or amplify data signals from macro base station 310 (e.g., via link 316) within an environment or structure in which base station 315 is located (e.g., homes, buildings, closed or isolated environments). For example, the structure may be located in a rural area where signals from macro base station 310 may be weak. With respect to forward link communications, base station 315 may amplify signals received from base station 310 and re-transmit the amplified signals within the structure. With respect to reverse link communications, base station 315 may amplify data signals received from mobile device 305b and re-transmit the amplified signals to base station 310.

In yet further related aspects, dual mode base station 315 may function either as an AP base station of a femto cell or as a repeater of a macro cell depending upon the availability/operating status of backhaul network 325. For example, if network 325 is available (i.e., is providing network connectivity to macro network 330), base station 315 may operate as an AP base station. If network 325 is not available (including but not limited to when the backhaul is intentionally disconnected, when there is unintentional failure, such as when the backhaul fails to operate normally, or when there is no failure but the backhaul service provider is performing a maintenance procedure, an upgrade, a test, etc.), base station 315 may operate as a repeater.

Figure 4A:
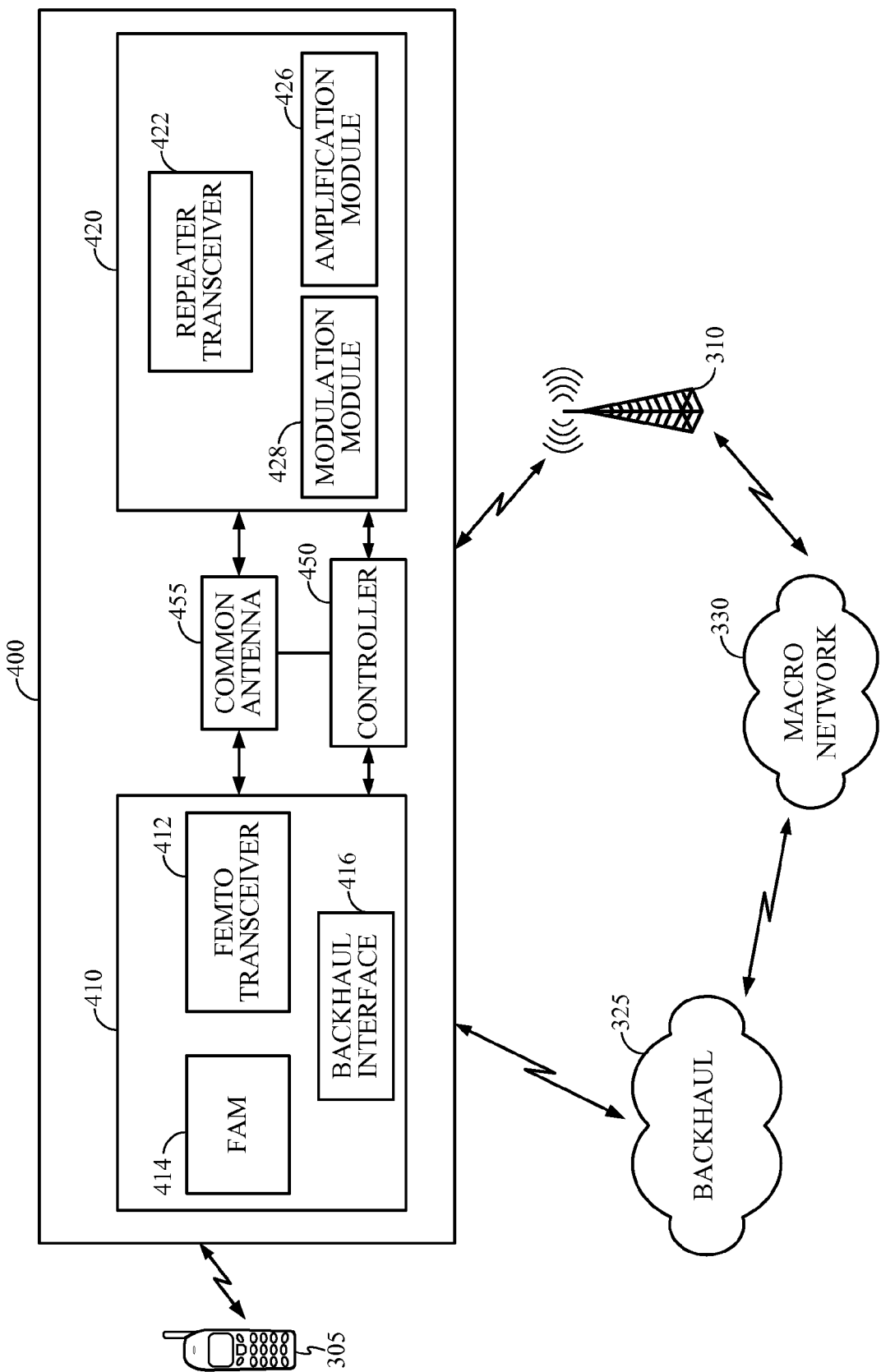
FIG. 4A illustrates one embodiment of a dual mode base station.

It is noted that the dual mode base station 315 may operate exclusively as an AP base station when backhaul 325 is functioning correctly, or exclusively as a repeater when network connectivity of backhaul 325 is lost or is otherwise unavailable. In the alternative, base station 315 may simultaneously operate as an AP base station for a femto cell and as a repeater for macro base station 310 of macro network 330. In this latter mode (referred to herein as femto-repeater mode), base station 315 may allow authorized ATs to access a given femto cell associated with base station 315 (via a femto module described in further detail below), while forwarding other unauthorized ATs to macro base station 310 or another femto cell (via a repeater module described in further detail below). Further details regarding the modules and components of a dual mode base station, such as the femto and repeater modules, are provided below with reference to the embodiments of FIGS. 4A and 4B.

In accordance with one or more aspects of the embodiments described herein, there are provided devices for providing wireless coverage redundancy. Such devices typically have a module/portion that allows the device to operate as an AP base station (associated with a given femto cell), as well as a module/portion that allows the device to operate as a repeater (that boosts and forwards received signals to a macro cell or another femto cell). In one embodiment, shown in FIG. 4A, the device may include two separate transceivers or communication modules—one for communicating with the backhaul of a given femto cell and another one for communicating with other base stations (e.g., a macro base station associated with a macro cell or an AP base station associated with another femto cell). In another embodiment, shown in FIG. 4B, the device may include a single/common transceiver for communicating with a backhaul of given femto cell and/or other base stations that are associated with macro cells or other femto cells.

With reference once again to FIG. 4A, there is illustrated an embodiment of a dual mode base station 400 that includes a femto module 410 with a femto transceiver 412, as well as a repeater module 420 with a repeater transceiver 422. Base station 400 may also include a controller/supervisor module 450 operatively coupled to femto and repeater modules 410, 420. Base station 400 may include a common antenna 455 coupled to femto and repeater modules 410, 420.

In related aspects, femto module 410 may also include a Femto Access Manager (FAM) 414 and a backhaul interface 416. FAM 414 may comprise a computing/network device or server, and may be in operative communication with a database (not shown) that stores authentication data. The database may store information including or relating to one or more of dual mode base station identities, owner identities, owner passwords, allowed identities, or the like. For example, FAM 414 may look up an identity for base station 400 for a given transaction based at least in part on an user device or AT identity (ID), identifier, and/or other related data entered by the AT user. FAM 414 may validate the given transaction by using the AT ID and/or the password. For example, FAM 414 may validate the transaction when the AT ID matches a stored owner's AT ID or the like.

Backhaul interface 416 may process data signals received from femto transceiver 412 such that the data signals to macro network 330 can be properly processed. For example, depending upon the architecture of the core network of macro network 330, interface 416 may be configured to package data signals from transceiver 412 using an Iub transport protocol, UMA signaling, SIP signaling, a proprietary protocol, or other suitable transport protocol, further details of which are provided below with reference to FIGS. 5-8.

In further related aspects, repeater module 420 may also include an amplification module 424 and/or a modulation module 426. It is noted that repeater transceiver 422 may include a receiver antenna (not shown) for receiving data from AT 305 over a given RF frequency band, such as a licensed RF frequency band rented by the network carrier. It is also noted that repeater transceiver 422 may also include a transmitter antenna (not shown) for transmitting data signals amplified by amplification module 426 to macro base station 310, which in turn forwards the data signals to macro network 330. For example, repeater 420 may simply amplify and retransmit the received signals. In the alternative, or in addition, repeater 420 may be an intelligent repeater that implements modulation module 428 to demodulate, amplify, and retransmit the received signals to base station 310.

Analogous to base station 310, transceivers 412 and/or 422 may be configured to communicate with mobile device 305 using RF frequencies in a licensed spectrum using an air interface such as CDMA2000, W-CDMA, WiMAX, LTE or other 3GPP interfaces. Alternatively, transceivers 412 and/or 422 may be configured to communicate with mobile device 305 using unlicensed RF frequencies such as air interface 802.11 (Wireless Fidelity or Wi-Fi) and UMA/Generic Access Network (GAN), or other suitable unlicensed RF frequency interface.

In yet further related aspects, control module 450 may monitor the availability/operating status of backhaul 325 and operate in a plurality of modes based at least in part on the status. For example, in one mode (repeater mode), controller 450 may select or otherwise activate repeater module 420 to facilitate communication between AT 305 and macro network 330 when the status indicates that backhaul 325 is not available. In the alternative, or in addition, the controller 450 may use repeater module 420 to facilitate communication between AT 305 and an AP base station associated with another femto cell (i.e., a femto cell other than the one that base station 400 is associated with).

In another mode (femto mode), controller 450 may monitor (continuously or intermittently) backhaul 325, and select or otherwise activate femto module 410 to forward data between AT 305 and macro network 330 the backhaul becomes available. In yet another mode (femto-repeater mode), controller 450 may place base station 400 in dual mode, whereby base station 400 operates both as a (i) femto cell AP and (ii) a repeater for macro base station 310 of macro network 330.

Controller 450 may be configured to allow authorized ATs to use femto cell 410, while forwarding unauthorized ATs (i.e., devices without femto cell access authorization) to macro base station 310 and/or other femto cells using repeater 420.

In still further related aspects, controller 450 may selectively power down femto cell module 410 and/or repeater module 420. For example, if backhaul 325 is available and the femto module 410 is being used (e.g., when base station 400 is in femto mode), then controller 450 may power down (or place in sleep or standby mode) repeater 420, thereby reducing power consumption by base station 400. In the alternative, or in addition, if the backhaul 325 is not available and the repeater module 420 is being used (e.g., when base station 400 is in repeater mode), then controller 450 may place femto module 410 into sleep or standby mode. Controller 450 may power down femto module 410 when repeater module 420 is transferring all or most data between AT 305 and macro network 330 or another femto cell.

When the base station 400 is operating in femto-repeater mode, controller 450 may leave both femto cell module 410 and repeater module 420 on. In this mode, controller 450 may monitor the transmission power level of transceivers 412, 422 and regulate the power level of each transceiver. It should be noted that interference may result when two data transmitting devices transmitting at different power levels within the same frequency band. To reduce such interference, controller 450 may be adapted to set the power levels of transceivers 412, 422 to be approximately the same. In this way, when two ATs are operating in the same area (with one AT in communication with transceiver 412 and with another AT in communication with transceiver 422), controller 450 may control both transceivers 412, 422 to transmit at approximately the same power level, thereby reducing interference between the respective transmitted signals.

Figure 4B:
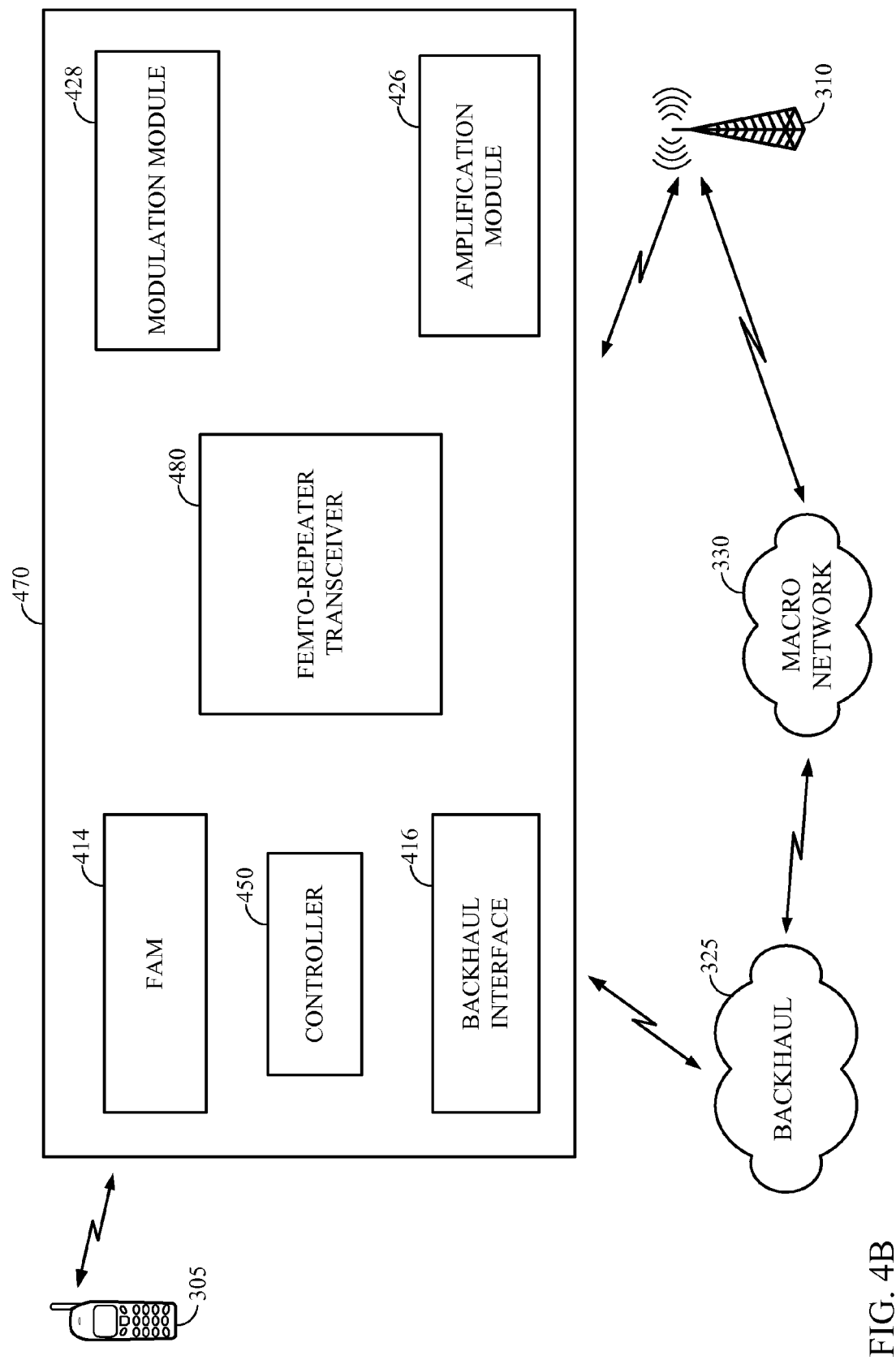
FIG. 4B illustrates another embodiment of a dual mode base station.

With reference to FIG. 4B, there is shown another embodiment of a dual mode base station 470 that includes a FAM 414, a backhaul interface 416, a controller 450, an amplification module 426, and a modulation module 428, each being in operative communication with one another, directly or indirectly. Base station 470 also includes a single femto-repeater transceiver 480 in lieu of two separate transceivers (e.g., femto transceiver 412 and repeater transceiver 422 in the embodiment of FIG. 4A). Femto-repeater transceiver 480 may be in operative communication with the other components of base station 470, and may allow base station 470 to communicate with a backhaul 325 of given femto cell and/or other base stations (e.g., macro base station 310) that are associated with macro cells, as well as other AP base stations associated with other femto cells. Otherwise, base station 470 is similar to base station 400 shown in FIG. 4A, and may contain some of the same features and functionalities as base station 400.

Figure 5:
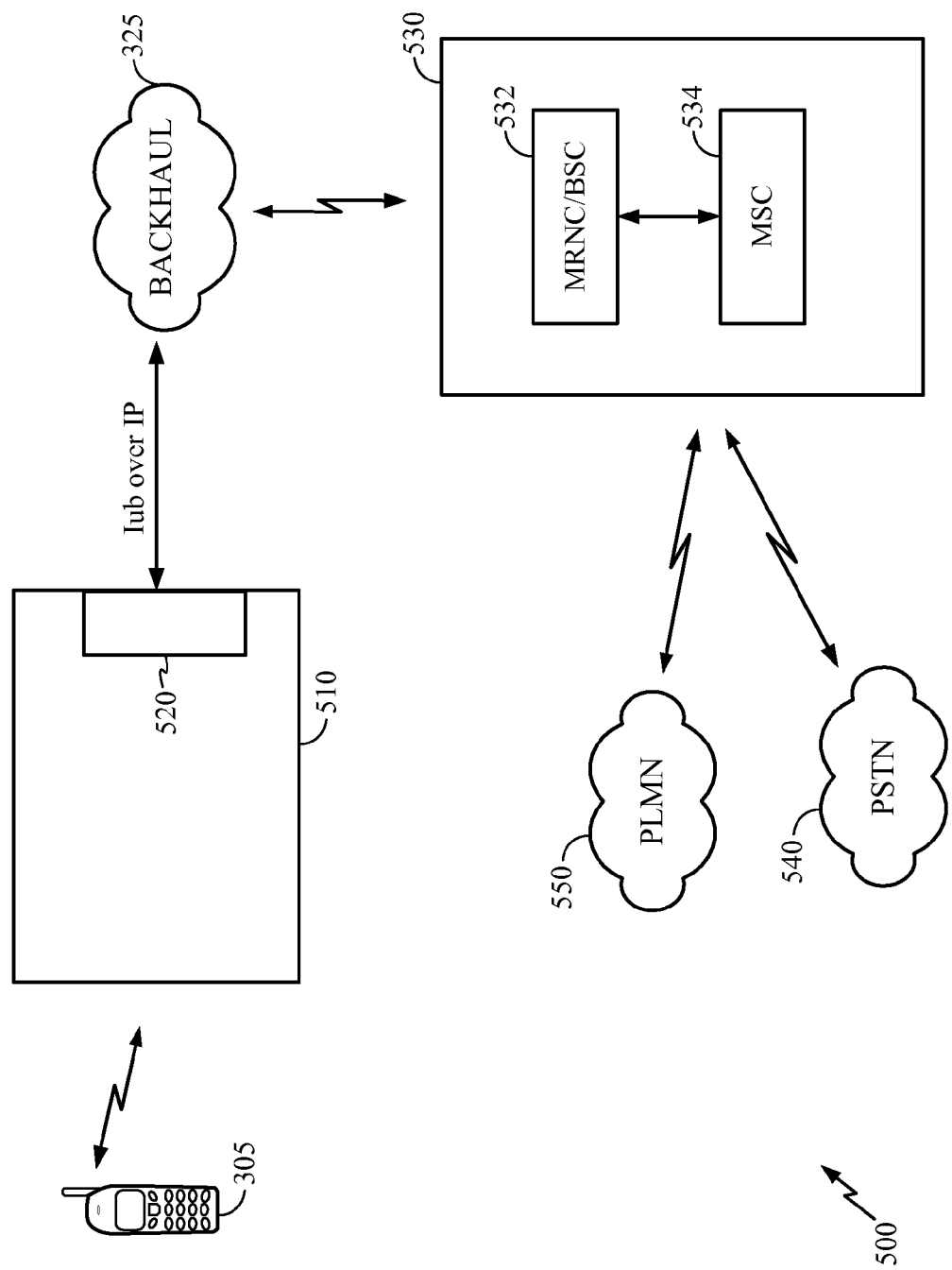
FIGS. 5-8 illustrate exemplary architectures for wireless communication systems.

With reference to FIG. 5, there is provided an embodiment of a wireless communication system 500 that implements a modified RNC architecture. System 500 may include an AT 305 in operative communication with a dual mode base station 510 that may include a backhaul interface 520. Interface 520 is in operative communication with backhaul network 325, which is in operative communication with macro network 530. Macro network 530 may include a modified RNC 532 and an MSC 534.

It is noted that the architecture implemented in system 500 is referred to as a modified RNC architecture because the RNC at macro network 530 is modified to properly accept Iub data packages being tunneled through backhaul 325 using IP signaling. Interface 520 may encapsulate data packages as Iub over IP data using IP signaling. Because the Iub over IP data are encapsulated with IP signaling, standard RNC at macro network 330 may be modified to accept the encapsulated IP signals. Interface 520 may include similar features and functionalities as backhaul interface 416 shown in FIGS. 4A and 4B. Once the data package is processed by MRNC 532 and MSC 534, it is forwarded to an end user of a PSTN network 540 or a PLMN network 550. It is noted that modified RNC 532 and MSC 534 may include similar features and functionalities as RNC 332 and MSC 334, respectively, of the embodiment of FIG. 3.

Figure 6:
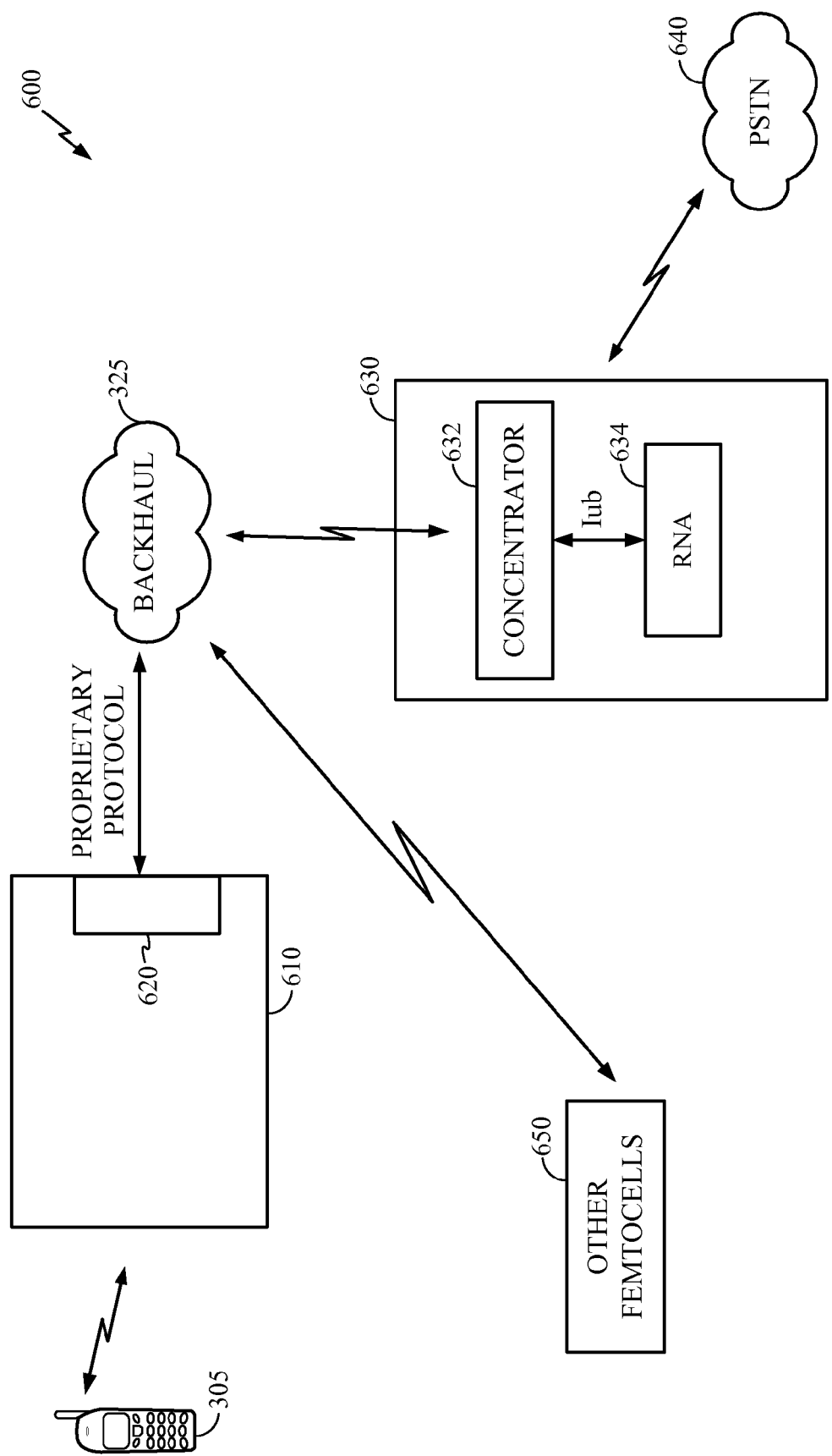

With reference to FIG. 6, there is provided an embodiment of a wireless communication system 600 that implements an Iub concentrator architecture. System 600 may include an AT 305 in operative communication with a dual mode base station 610 that may include a backhaul interface 620. Interface 620 is in operative communication with backhaul network 325, which is in operative communication with macro network 630. Macro network 630 may include a concentrator 632 and a standard RNC 634.

By using concentrator 610 designed to handle a large volume of femto cells (including those femto cells 650 other than the given femto cell that base station 610 is associated with), system 600 may be scaled for large scale deployment. Interface 620 may use a transport protocol to package its voice and non-voice data, which may then be transmitted to concentrator 610 at macro network 630 via backhaul 325. Once the formatted data package is received by concentrator 610, it may be re-packaged as a standard Iub over IP package so that it can be properly processed by RNC 634. Once the data package is processed by concentrator 632 and RNA 634, it may be forwarded to an end user of a PSTN network 640 or the like.

Figure 7:
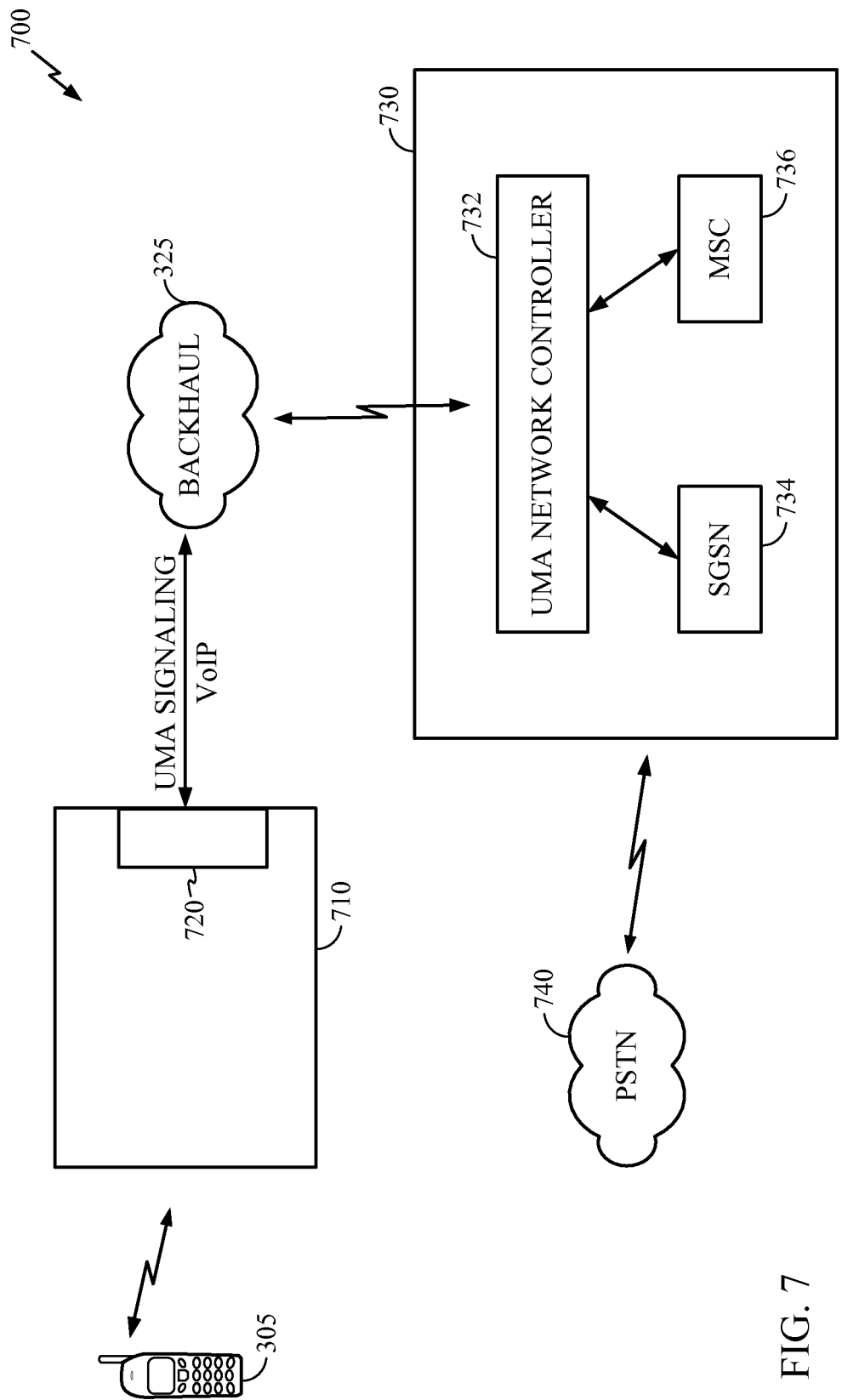

With reference to FIG. 7, there is provided an embodiment of a wireless communication system 700 that implements a UMA/GAN enabled architecture. System 700 may include an AT 305 in operative communication with a dual mode base station 710 that may include a backhaul interface 720. Interface 720 is in operative communication with backhaul network 325, which is in operative communication with macro network 730. Macro network 730 may include a UMA network controller 732, a Serving GPRS Support Node (SGSN) 734 and/or a MSC 736.

Interface 720 may be configured to package voice and non-voice data using UMA signaling protocol. Interface 720 may include an integrated UMA or GAN client or the like. In this way, interface 720 may package incoming and outgoing data using UMA signaling. At macro network 730, UMA network controller 732 may receive the UMA signaling data and forward it to SGSN 734 or MSC 736. The data may then be forwarded to PTSN network 740 or to another network that utilizes a GPRS tunneling protocol or the like.

Figure 8:
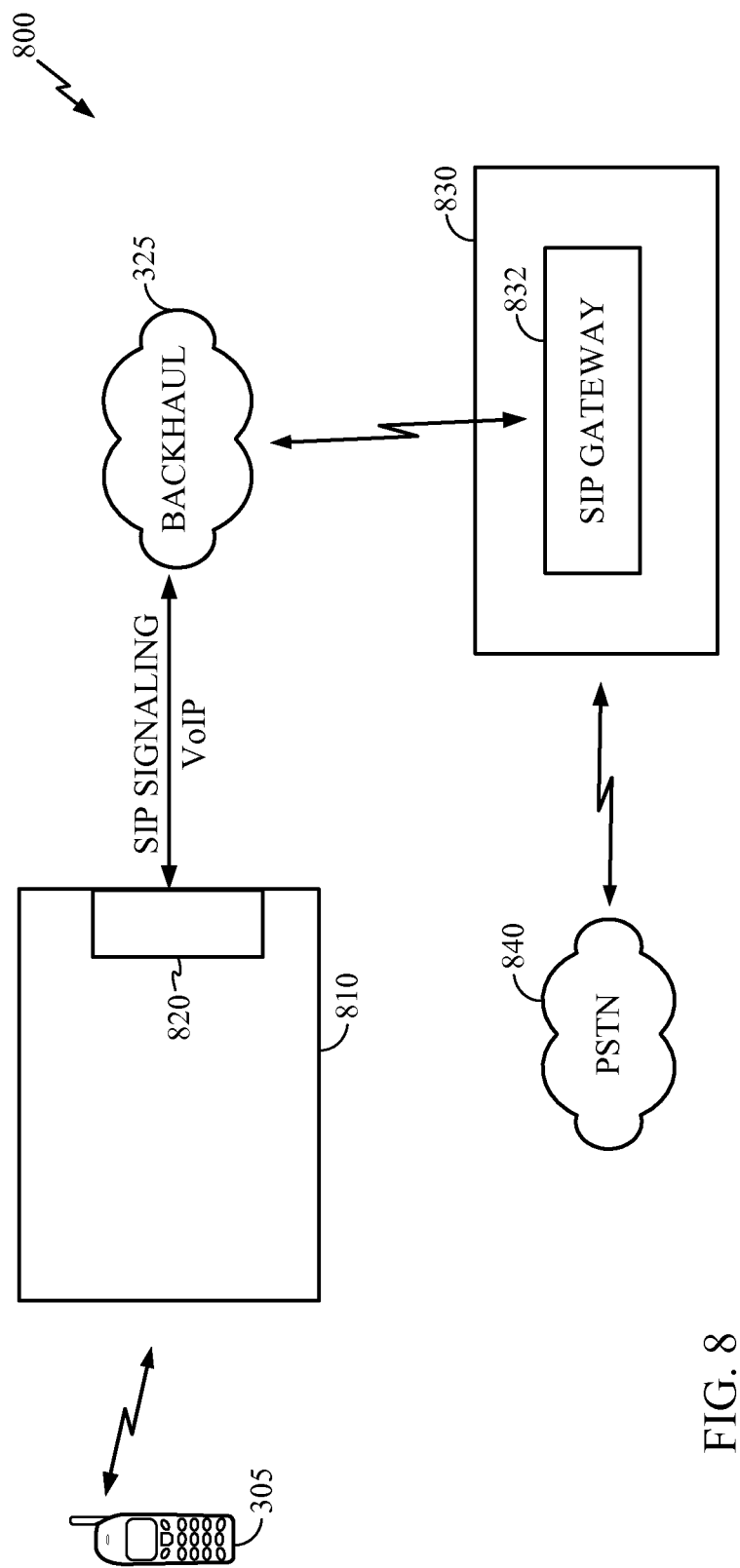

With reference to FIG. 8, there is provided an embodiment of a wireless communication system 800 that implements a Session Initiated Protocol (SIP) enabled architecture. System 800 may include an AT 305 in operative communication with a dual mode base station 810 that may include a backhaul interface 820. Interface 820 is in operative communication with backhaul network 325, which is in operative communication with macro network 830. Macro network 830 may include a SIP gateway 820. Interface 820 may include an integrated RNC or the like. Data may be transferred between interface 820 and macro network 830 using VoIP with SIP signaling. At macro network 830, SIP gateway 820 may receive data from interface 820 and may then process and transfer the data to a PSTN network or other communication network.

Figure 9A:
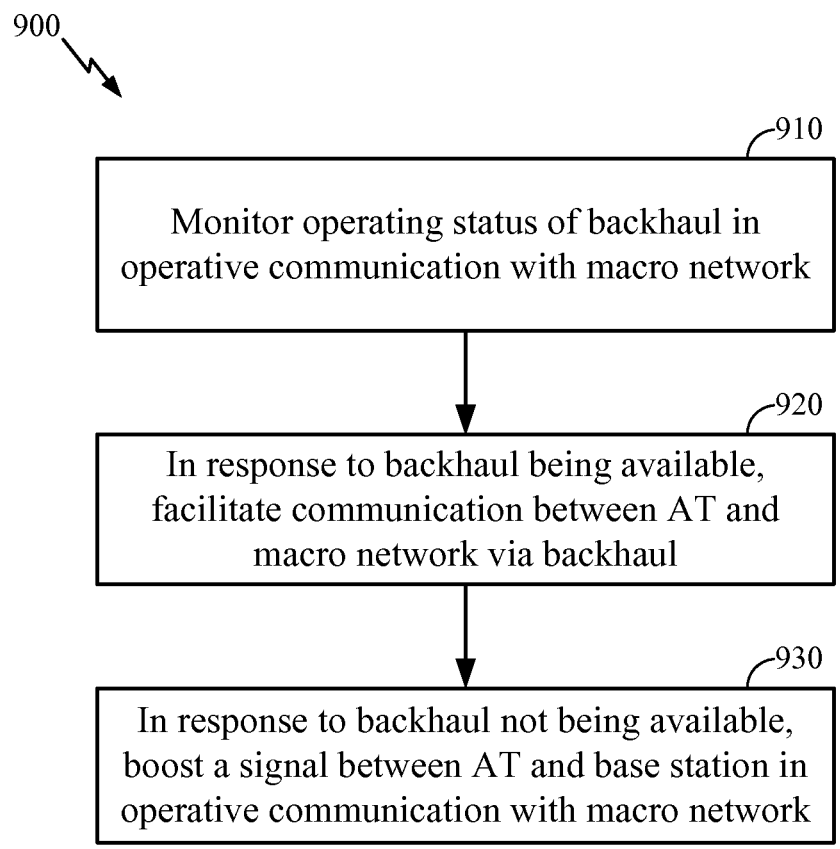
FIG. 9A shows one embodiment of a method for providing wireless coverage redundancy.

In accordance with one or more aspects of the embodiments described herein, there are provided methods for providing wireless coverage redundancy. With reference to the flow diagram shown in FIG. 9A, there is provided a method 900 that may involve monitoring or determining an availability/operating status of a communication backhaul in operative communication with a macro network (step 910). At step 920, in response to the backhaul being available, the method 900 may involve facilitating communication between an access terminal (AT) and the macro network via the backhaul. The method 900 may involve, in response to the backhaul not being available (e.g., when the backhaul is intentionally disconnected, when there is unintentional failure, such as when the backhaul fails to operate normally, or when the backhaul service provider is running or performing a maintenance procedure, a line adjustment, an upgrade, a test, or the like, or combinations thereof), boosting a communication signal between the AT and a base station in operative communication with the macro network (step 930).

Figure 9B:
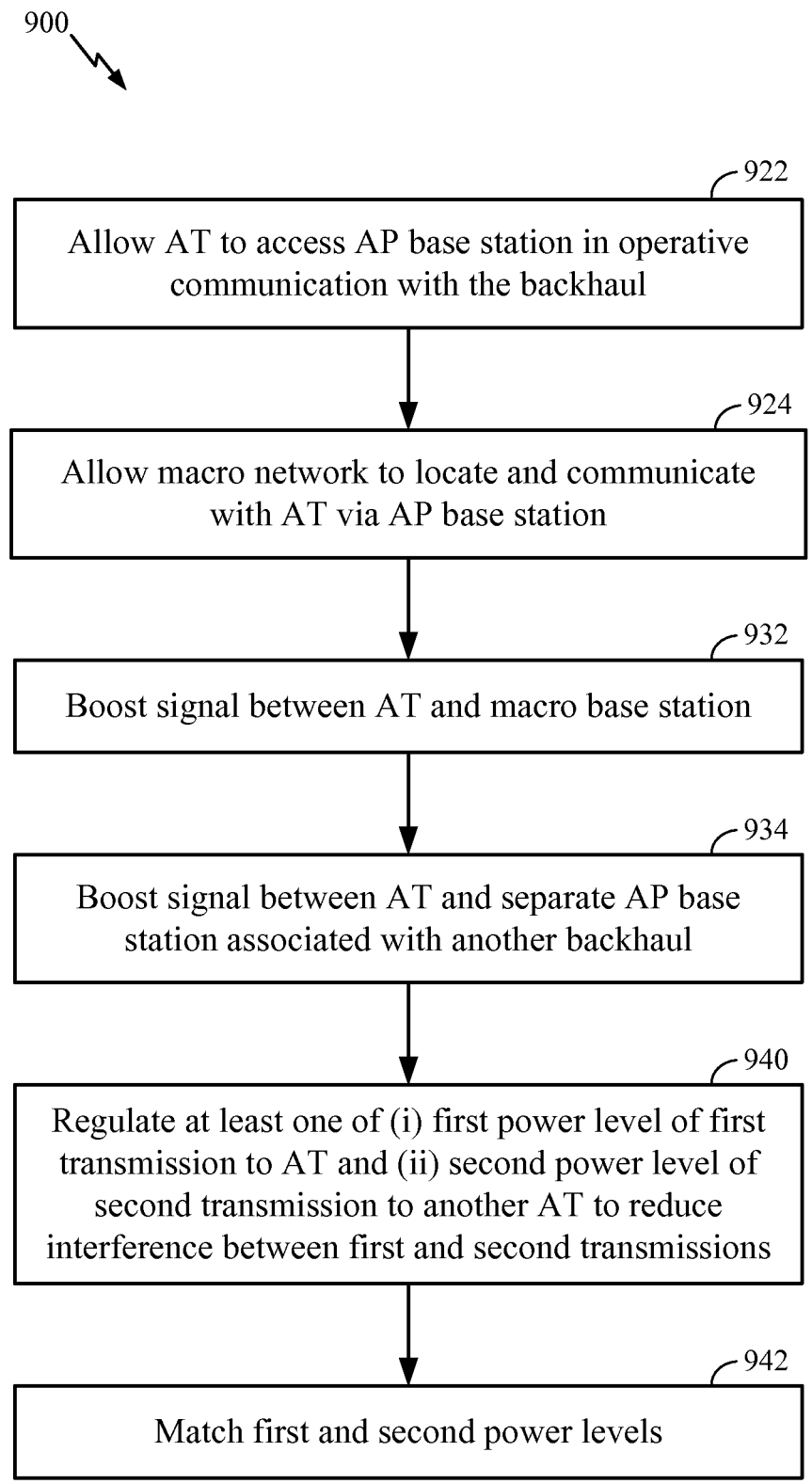
FIG. 9B shows sample aspects of the method shown in FIG. 9A.

In related aspects, step 910 may involve monitoring the availability of at least one of digital subscriber line (DSL), cable internet access, and Ethernet. In further related aspects, with reference now to the flow diagram of FIG. 9B, step 920 may involve allowing the AT to access an access point (AP) in operative communication with the backhaul (step 922). Step 920 may also involve allowing the macro network to locate and communicate with the AT via the AP base station (step 924).

In yet further related aspects, step 930 may involve boosting the signal between the AT and a macro base station in operative communication with the macro network (step 932), and/or boosting the signal between the AT and a separate AP base station associated with another communication backhaul in operative communication with the macro network (step 934). Boosting may involve: receiving the signal; amplifying the received signal; and forwarding the amplified signal to at least one of the AT and the given base station.

In still other related aspects, the method 900 may also involve, as step 940, regulating at least one of (i) a first power level of a first transmission to the AT and (ii) a second power level of a second transmission to another AT to reduce interference between the first and second transmissions. Regulating comprises matching the first and second power levels (step 942).

Figure 10A:
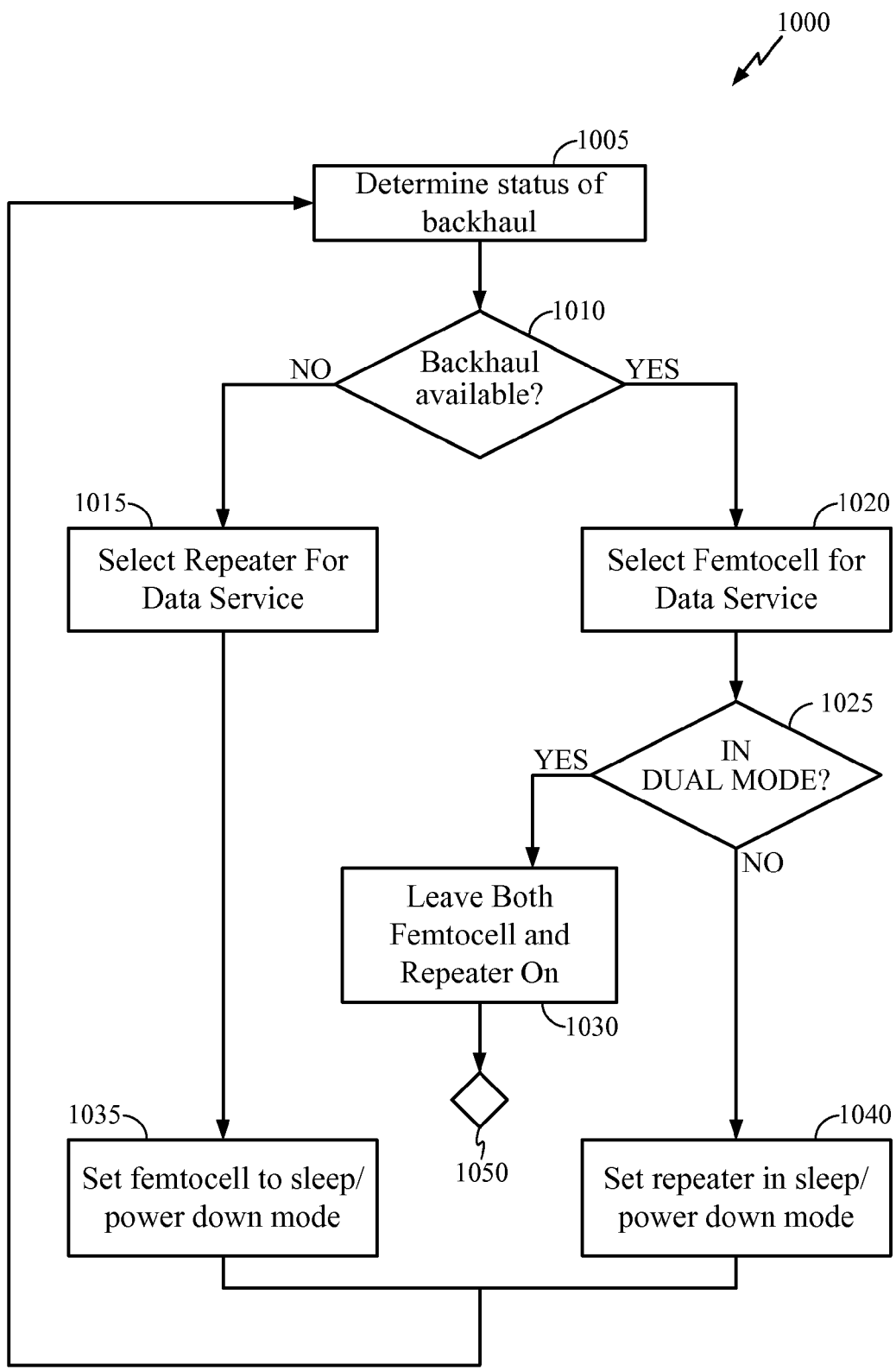
FIGS. 10A-B show another embodiment of a method for providing wireless coverage redundancy.

With reference to the flow diagram of FIG. 10A, there are illustrated steps of a method 1000 for communicating using a dual mode base station. The method 1000 starts at step 1005, where the availability/operating status of the backhaul is analyzed to determine (at step 1010) whether the backhaul is available. At step 1015, if the status indicates that the backhaul is not available, then a repeater module or the like is selected as the data service provider for a given AT (repeater mode). The selected repeater will be responsible for transferring most or all of the data (i) between the given AT and a macro network or (ii) between the given AT and AP base stations associated with other femto cells.

At step 1020, if the status indicates that the backhaul is available, then a femto cell module or the like is selected as the data service provider for the given AT (femto mode). This means that the selected femto cell module will be responsible for transferring most or all of the data between the given AT and the macro network core of the macro network.

At step 1025, the method 1000 involves determining whether the base station is simultaneously operating as a femto cell AP and as a repeater (femto-repeater mode). For example, with reference to embodiment of FIG. 4A, base station 400 can be in femto-repeater mode when both femto cell module 410 and repeater module 420 are operating at the same time, with each module servicing different mobile devices. If base station 400 is set to operate in femto-repeater mode, then neither the femto cell module nor the repeater module will be powered down or placed into sleep mode. Rather, both modules will remain or be powered on if they are not already operational in step 1030. Additionally, in femto-repeater mode, base station 400 may be configured to manage the transmission power of the transceivers, as outlined in FIG. 10B.

At step 1035, the femto cell module may optionally be powered down or placed in sleep mode. At step 1040, the repeater module may be powered down or placed in sleep mode if the base station is not operating in dual or femto-repeater mode. After steps 1035 or 1040, the method 1000 may return to step 1005 and the above-described steps may be repeated.

Figure 10B:
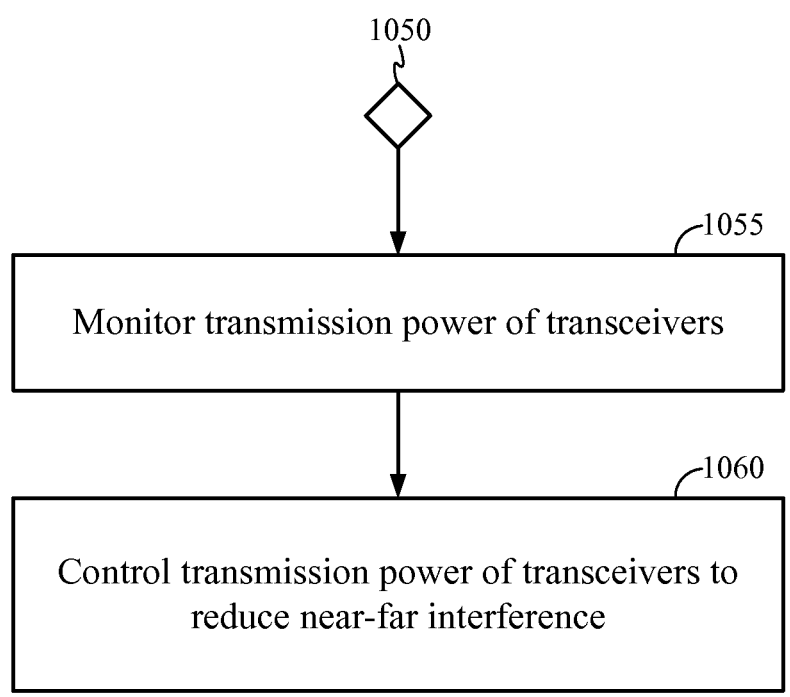

With reference FIG. 10B, the method 1000 may further comprise monitoring the power levels of transmissions to ATs (step 1055), and controlling or adjusting the power levels of transmissions such that interferences associated with nearby ATs are reduced or minimized (step 1060). In one scenario, wherein the dual mode base station includes two transceivers (e.g., femto transceiver and repeater transceiver), the method 1000 proceeds to step 1050, which may involve monitoring the transmission power levels of both the femto cell and repeater transceivers (step 1055). At step 1060, the method 1000 may involve controlling the power levels of the respective transceivers to reduce any interference that may occur between signals transmitted by the respective transceivers. For example, the power levels of the femto transceiver and the repeater transceiver may be approximately matched, thereby balancing the coverage regions for the ATs communicating with the femto and repeater transceivers.

Figure 11A:
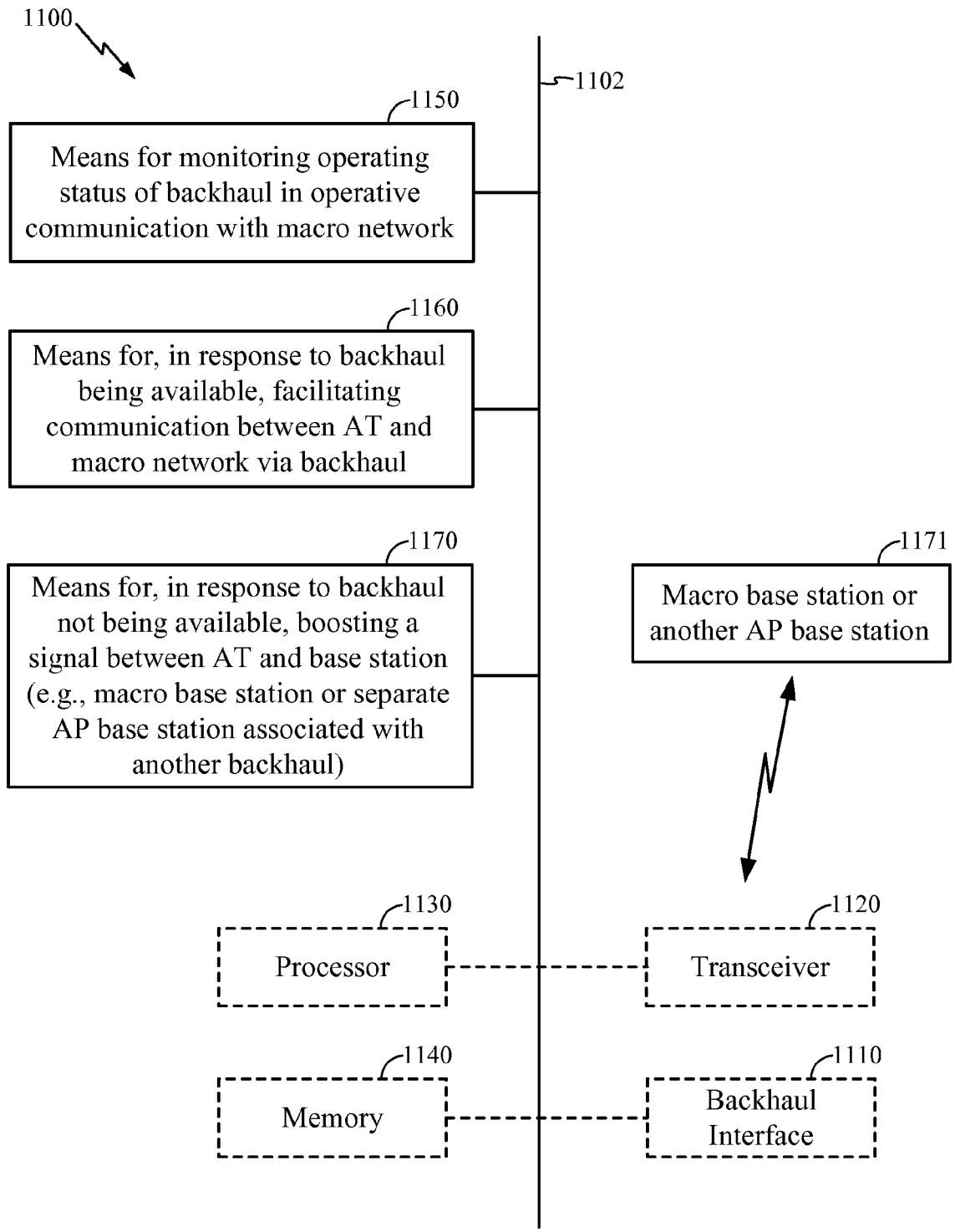
FIG. 11A illustrates one embodiment of an apparatus for providing wireless coverage redundancy.

In accordance with one or more aspects of the embodiments described herein, there are provided devices and apparatuses for providing wireless coverage redundancy. With reference to FIG. 11A, there is provided an exemplary apparatus 1100 that may be configured as either a communication device or base station, or as a processor or similar device for use within a communication device or base station. As illustrated, apparatus 1100 may comprise a means 1150 for monitoring a communication backhaul (e.g., DSL, cable internet access, Ethernet, or the like). The apparatus 1100 may comprise a means 1160 for, in response to the backhaul being available, facilitating communication between an access terminal (AT) and a macro network via the backhaul. The apparatus 1100 may comprise a means 1170 for, in response to the backhaul not being available, boosting a communication signal between the AT and a base station 1171, such as, for example, (i) a macro base station in operative communication with the macro network or (ii) an AP base station associated with another communication backhaul that is in operative communication with the macro network.

Figure 11B:
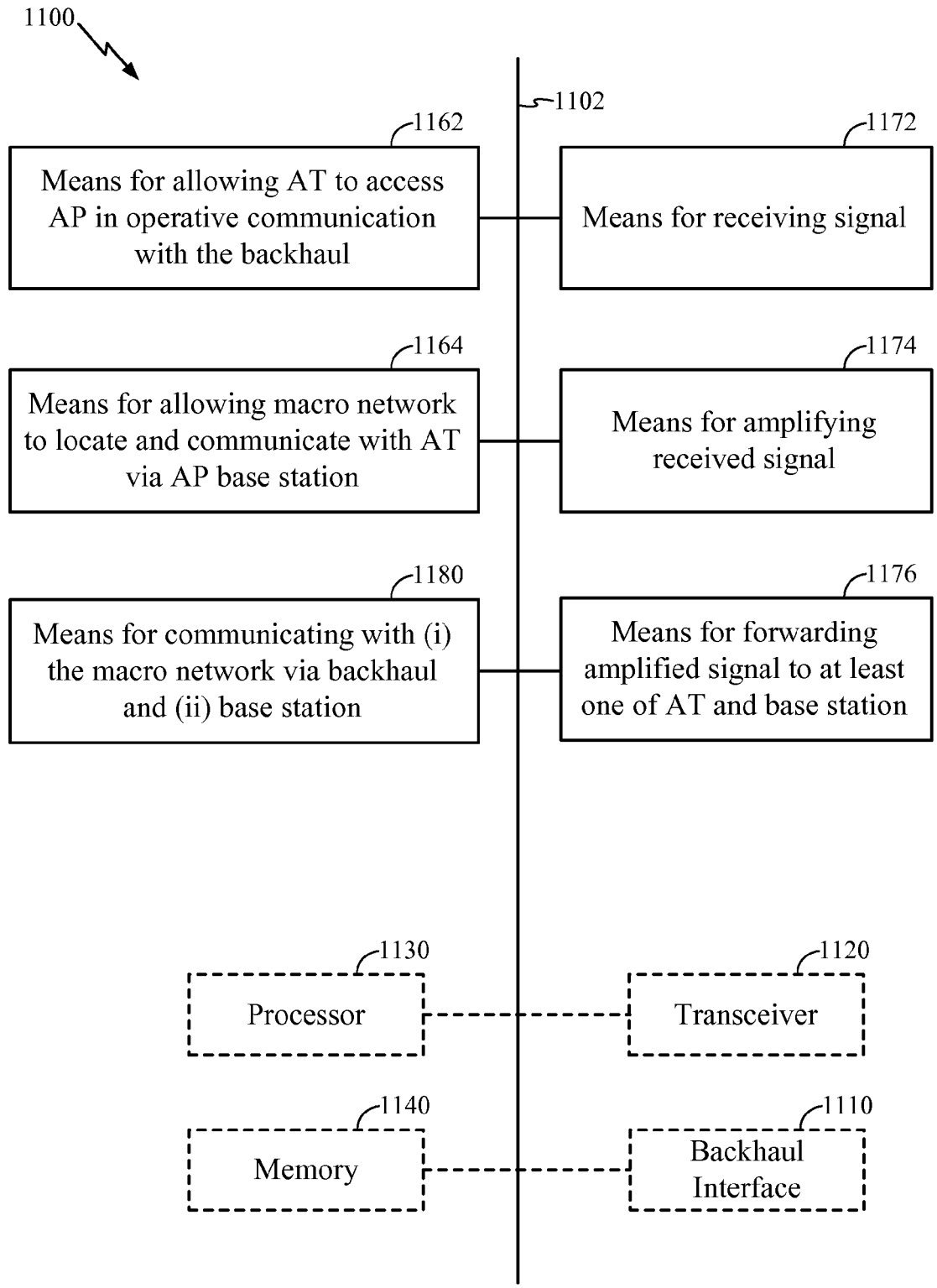
FIGS. 11B-C illustrate sample aspects of the apparatus shown in FIG. 11A

With reference to FIG. 11B, the means 1160 for facilitating may comprise a means 1162 for allowing the AT to access an access point (AP) of apparatus 1100 in operative communication with the backhaul, and a means 1164 for allowing the macro network to locate and communicate with the AT via the AP. The means 1170 for boosting may comprise: a means 1172 for receiving the signal; a means 1174 for amplifying the received signal; and a means 1176 for forwarding the amplified signal to at least one of the AT and the base station 1171. Apparatus 1100 may also comprise a means 1180 for communicating with (i) the macro network via the backhaul and (ii) the base station (e.g., a femto-repeater transceiver or the like).

Figure 11C:
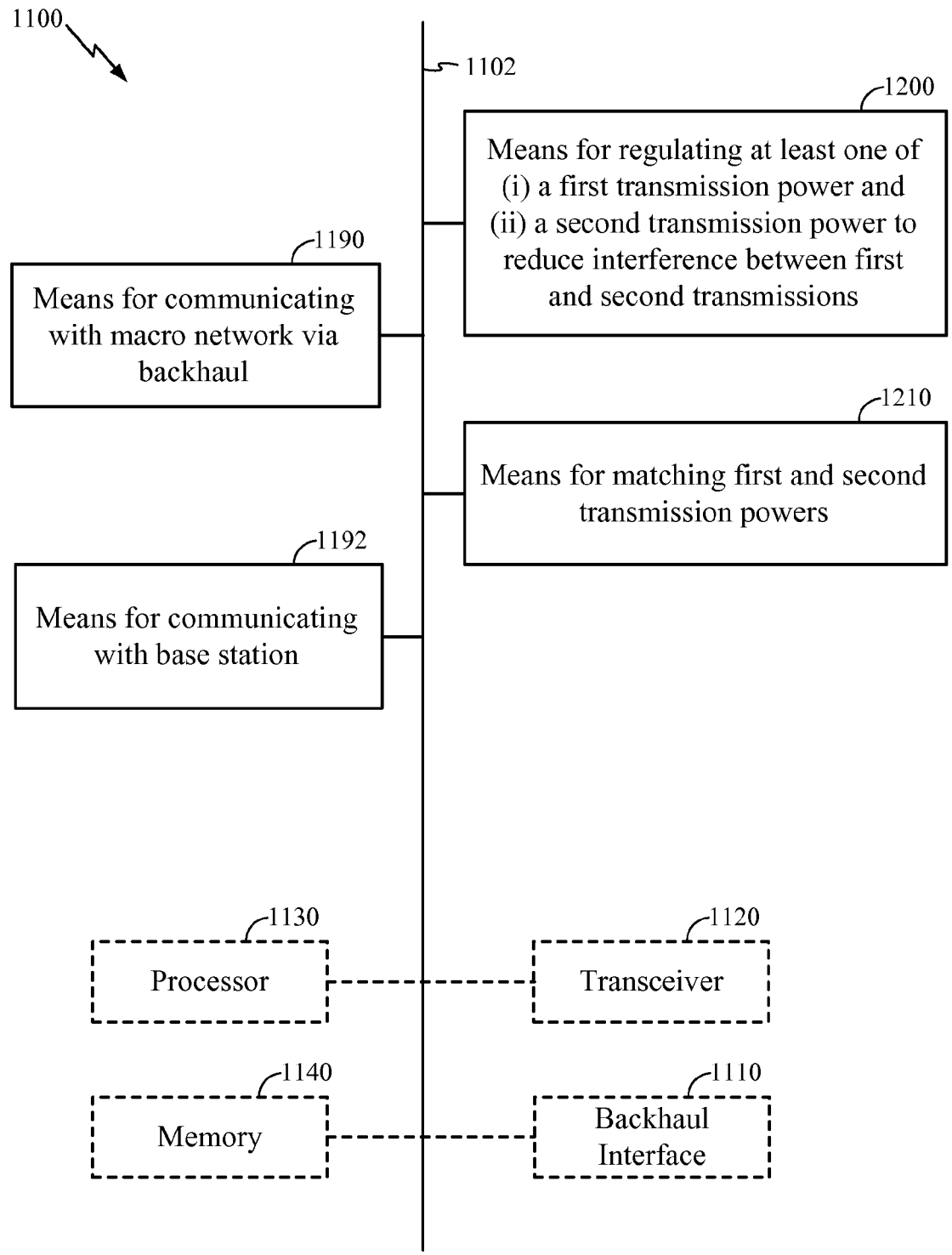

With reference to FIG. 11C, apparatus 1100 may comprise a means 1190 for communicating with the macro network via the backhaul (e.g., a femto transceiver or the like) and/or a means 1192 for communicating with the base station 1171 (e.g., a repeater transceiver or the like). Apparatus 1100 may also comprise a means 1200 for regulating at least one of (i) a first transmission power of the means 1190 for communicating with the macro network via the backhaul and (ii) a second transmission power of the means 1192 for communicating with the base station 1171 to reduce interference between first and second transmissions. The means 1200 for regulating may comprise a means 1210 for matching the first and second transmission powers.

It is noted that apparatus 1100 may optionally include a processor module 1130 having at least one processor, in the case of apparatus 1100 configured as a communication terminal or dual mode base station, rather than as a processor. Processor 1130, in such case, may be in operative communication with means 1150-1210, and components thereof, via a bus 1102 or similar communication coupling. Processor 1130 may effect initiation and scheduling of the processes or functions performed by means 1150-1210, and components thereof.

Apparatus 1100 may optionally include a backhaul interface 1110 for the backhaul in operative communication with a macro network. Apparatus 1100 may optionally include a transceiver module 1120 for communicating with at least one of (i) the AT, (ii) the macro network via the backhaul, and (iii) the base station 1171. A stand alone receiver and/or stand alone transmitter may be used in lieu of or in conjunction with the transceiver 1120.

In related aspects, transceiver module 1120 may comprise a transceiver for communicating with (i) the macro network via the backhaul and (ii) the base station 1171. In the alternative, the transceiver module 1120 may comprise a first transceiver for communicating with the macro network via the backhaul and/or a second transceiver for communicating with the base station 1171. The processor module 1130 may regulate at least one of (i) a first transmission power of the first transceiver and (ii) a second transmission power of the second transceiver to reduce interference between first and second transmissions. For example, the processor module 1120 may match the first and second transmission powers.

In further related aspects, apparatus 1100 may optionally include a means for storing information, such as, for example, a memory device/module 1140. Computer readable medium or memory device/module 1140 may be operatively coupled to the other components of apparatus 1100 via bus 1102 or the like. The computer readable medium or memory device 1140 may be adapted to store computer readable instructions and data for effecting the processes and behavior of means 1150-1210, and components thereof, or processor 1130 (in the case of apparatus 1100 configured as a dual mode base station or the like) or the methods disclosed herein.

In yet further related aspects, the memory module 1140 may optionally include executable code for the processor module 1130 to: (a) monitor an availability/operating status of the backhaul; (b) in response to the backhaul being available, facilitate communication between the AT and the macro network via the backhaul; and/or (c) in response to the backhaul not being available, boosting a communication signal between the AT and the base station 1171. One or more of steps (a)-(c) may be performed by processor module 1130 in lieu of or in conjunction with the means 1150-1210 described above.

While this application describes particular examples of the present invention, those of ordinary skill can devise variations of the present invention without departing from the inventive concept. For example, the teachings herein refer to circuit-switched network elements but are equally applicable to packet-switched domain network elements. It is noted that the word "exemplary" is used herein to mean "serving as an example, instance, or illustration." Any embodiment described herein as "exemplary" is not necessarily to be construed as preferred or advantageous over other embodiments.

It will be appreciated that, in accordance with one or more aspects described herein, inferences can be made regarding determining communication parameters for a plurality of surrounding femto cells and/or macro cells as described. As used herein, the term to "infer," or "inference," refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Furthermore, various embodiments are described herein in connection with a mobile device. A mobile device can also be called a system, subscriber unit, subscriber station, mobile station, mobile, remote station, remote terminal, Access Terminal (AT), user terminal, terminal, wireless communication device, user agent, user device, or User Equipment (UE). A mobile device can be a cellular telephone, a cordless telephone, a Session Initiation Protocol (SIP) phone, a Wireless Local Loop (WLL) station, a Personal Digital Assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as Code Division Multiple Access (CDMA), Multiple-Carrier CDMA (MC-CDMA), Wideband CDMA (W-CDMA), High-Speed Packet Access (HSPA, HSPA+), Time Division Multiple Access (TDMA), Frequency Division Multiple Access (FDMA), Orthogonal Frequency Division Multiple Access (OFDMA), Single Carrier Frequency Domain Multiplexing (SC-FDMA) and other multiple access systems/techniques. The terms "system" and "network" may be used interchangeably. A CDMA system may implement a radio technology such as Universal Terrestrial Radio Access (UTRA), CDMA2000, etc. UTRA may include W-CDMA and/or other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). It is further noted that the wireless communication system described herein may implement one or more standards, such as, for example, IS-95, CDMA2000, IS-856, W-CDMA, TD-SCDMA, etc.

The various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for wireless coverage redundancy, comprising:
   monitoring a communication backhaul in operative communication with a macro network;
   in response to the backhaul being available, facilitating communication between an access terminal (AT) and the macro network via the backhaul and determining whether an access point (AP) base station simultaneously operates as an AP and a repeater, wherein an authorized AT uses the AP base station as an AP while an unauthorized AT uses the AP base station as a repeater; and in response to the backhaul not being available, boosting a communication signal between the AT and a base station in operative communication with the macro network.

2. The method of claim 1, wherein monitoring comprises monitoring at least one of digital subscriber line (DSL), cable internet access, Ethernet, T1, fiber, and Wi-Fi.

3. The method of claim 1, wherein facilitating comprises allowing the AT to access the access point (AP) base station in operative communication with the backhaul.

4. The method of claim 3, wherein facilitating further comprises allowing the macro network to communicate with the AT via the AP base station.

5. The method of claim 1, wherein boosting comprises boosting the signal between the AT and a macro base station in operative communication with the macro network.

6. The method of claim 1, further comprising boosting the signal between another AT and a macro base station in operative communication with the macro network.

7. The method of claim 1, wherein boosting comprises boosting the signal between the AT and a separate AP base station associated with another communication backhaul in operative communication with the macro network.

8. The method of claim 1, further comprising boosting the signal between another AT and a separate AP base station associated with another communication backhaul in operative communication with the macro network.

9. The method of claim 1, wherein boosting comprises:
receiving the signal from the macro network;
amplifying the received signal; and
forwarding the amplified signal to the AT.

10. The method of claim 1, wherein boosting comprises:
receiving the signal from the AT;
amplifying the received signal; and
forwarding the amplified signal to the macro network.

11. The method of claim 1, further comprising regulating at least one of (i) a first power level of a first transmission to the AT and (ii) a second power level of a second transmission to another AT to reduce interference between the first and second transmissions.

12. The method of claim 11, wherein regulating comprises matching the first and second power levels.

13. An access point (AP) base station, comprising:
a backhaul interface for a communication backhaul in operative communication with a macro network;
a transceiver module for communicating with at least one of (i) an access terminal (AT), (ii) the macro network via the backhaul, and (iii) a base station in operative communication with the macro network;
at least one processor operatively coupled with the interface and the transceiver module; and
a memory module operatively coupled with the at least one processor and comprising executable code for the at least one processor to:
(a) monitor the backhaul;
(b) in response to the backhaul being available, facilitate communication between the AT and the macro network via the backhaul and determine whether the AP base station simultaneously operates as an AP and a repeater, wherein an authorized AT uses the AP base station as an AP while an unauthorized AT uses the AP base station as a repeater; and (c) in response to the backhaul not being available, boosting a communication signal between the AT and the base station.

14. The device of claim 13, wherein the backhaul comprises at least one of digital subscriber line (DSL), cable internet access, Ethernet, T1, fiber, and Wi-Fi.

15. The device of claim 13, wherein the at least one processor facilitates the communication between the AT and the macro network by allowing the AT to access the access point (AP) of the device in operative communication with the backhaul.

16. The device of claim 15, wherein the at least one processor allows the macro network to communicate with the AT via the AP base station.

17. The device of claim 13, wherein the base station comprises a macro base station in operative communication with the macro network.

18. The device of claim 13, wherein the base station comprises a separate AP base station associated with another communication backhaul in operative communication with the macro network.

19. The device of claim 13, wherein the at least one processor boosts the communication signal by:
receiving the signal from the macro network;
amplifying the received signal; and
forwarding the amplified signal to the AT.

20. The device of claim 13, wherein the at least one processor boosts the communication signal by:
receiving the signal from the AT;
amplifying the received signal; and
forwarding the amplified signal to the macro network.

21. The device of claim 13, wherein the transceiver module comprises a transceiver for communicating with (i) the macro network via the backhaul and (ii) the base station.

22. The device of claim 13, wherein the transceiver module comprises a first transceiver for communicating with the macro network via the backhaul.

23. The device of claim 22, wherein the transceiver module comprises a second transceiver for communicating with the base station.

24. The device of claim 23, wherein the at least one processor regulates at least one of (i) a first transmission power of the first transceiver and (ii) a second transmission power of the second transceiver to reduce interference between first and second transmissions.

25. The device of claim 24, wherein the at least one processor matches the first and second transmission powers.

26. An access point (AP) base station, comprising:
means for monitoring a communication backhaul in operative communication with a macro network;
means for facilitating communication between an access terminal (AT) and the macro network via the backhaul in response to the backhaul being available;
means for determining whether the AP base station simultaneously operates as an AP and a repeater in response to the backhaul being available, wherein an authorized AT uses the AP base station as an AP while an unauthorized AT uses the AP base station as a repeater; and
means for boosting a communication signal between the AT and a base station in operative communication with the macro network in response to the backhaul not being available.

27. The apparatus of claim 26, wherein the backhaul comprises at least one of digital subscriber line (DSL), cable internet access, Ethernet, T1, fiber, and Wi-Fi.

28. The apparatus of claim 26, wherein the means for facilitating comprises means for allowing the AT to access the access point (AP) of the apparatus in operative communication with the backhaul.

29. The apparatus of claim 28, wherein the means for facilitating comprises means for allowing the macro network to communicate with the AT via the AP base station.

30. The apparatus of claim 26, wherein the base station comprises a macro base station in operative communication with the macro network.

31. The apparatus of claim 26, wherein the base station comprises a separate AP base station associated with another communication backhaul in operative communication with the macro network.

32. The apparatus of claim 26, wherein the means for boosting comprises:
means for receiving the signal from the macro network;
means for amplifying the received signal; and
means for forwarding the amplified signal to the AT.

33. The apparatus of claim 26, wherein the means for boosting comprises:
means for receiving the signal from the AT;
means for amplifying the received signal; and
means for forwarding the amplified signal to the macro network.

34. The apparatus of claim 26, further comprising means for communicating with (i) the macro network via the backhaul and (ii) the base station.

35. The apparatus of claim 26, further comprising means for communicating with the macro network via the backhaul.

36. The apparatus of claim 35, further comprising means for communicating with the base station.

37. The apparatus of claim 36, further comprising means for regulating at least one of (i) a first transmission power of the means for communicating with the macro network via the backhaul and (ii) a second transmission power of the means for communicating with the base station to reduce interference between first and second transmissions.

38. The apparatus of claim 37, wherein the means for regulating comprises a means for matching the first and second transmission powers.

39. A computer program product, comprising:
a non-transitory computer-readable medium comprising:
code for causing a computer to monitor a communication backhaul in operative communication with a macro network
code for causing a computer to, in response to the backhaul being available, facilitate communication between an access terminal (AT) and the macro network via the backhaul and determine whether an access point (AP) base station simultaneously operates as an AP and a repeater, wherein an authorized AT uses the AP base station as an AP while an unauthorized AT uses the AP base station as a repeater; and
code for causing a computer to, in response to the backhaul not being available, boost a communication signal between the AT and a base station in operative communication with the macro network.

40. The computer program product of claim 39, wherein the backhaul comprises at least one of digital subscriber line (DSL), cable internet access, Ethernet, T1, fiber, and Wi-Fi.

41. The computer program product of claim 39, wherein the backhaul is in operative communication with the access point (AP) base station.

42. The computer program product of claim 41, wherein the AP base station allows the macro network to communicate with the AT.

43. The computer program product of claim 39, wherein the base station comprises a macro base station in operative communication with the macro network.

44. The computer program product of claim 39, wherein the base station comprises a separate AP base station associated with another communication backhaul in operative communication with the macro network.

45. The computer program product of claim 39, wherein the computer-readable medium further comprises code for causing a computer to regulate at least one of (i) a first power level of a first transmission to the AT and (ii) a second power level of a second transmission to another AT to reduce interference between the first and second transmissions.

46. The computer program product of claim 45, wherein the first and second power levels are matched.

* * * * *